(12) United States Patent
Nagele et al.

(10) Patent No.: US 7,600,304 B2
(45) Date of Patent: Oct. 13, 2009

(54) METHOD FOR PRODUCTION OF A FIXING PIECE

(75) Inventors: Klaus Nagele, Oberndorf (DE); Axel Schulte, Holzgerlingen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 329 days.

(21) Appl. No.: 10/516,459

(22) PCT Filed: Oct. 31, 2003

(86) PCT No.: PCT/EP03/12107

§ 371 (c)(1),
(2), (4) Date: Dec. 3, 2004

(87) PCT Pub. No.: WO2004/067314

PCT Pub. Date: Aug. 12, 2004

(65) Prior Publication Data

US 2006/0048372 A1    Mar. 9, 2006

(30) Foreign Application Priority Data

Jan. 29, 2003  (DE) ................................ 103 03 358

(51) Int. Cl.
*B68G 7/00* (2006.01)
(52) U.S. Cl. ........................... 29/91.1; 29/91; 29/527.1; 156/66; 297/463.1; 428/159
(58) Field of Classification Search ................ 29/527.1, 29/428, 91.1, 91; 297/463.1; 428/122, 159; 156/66, 196, 227
See application file for complete search history.

(56) References Cited

U.S. PATENT DOCUMENTS

| 4,197,342 | A | * | 4/1980 | Bethe | .......................... 428/159 |
| 6,048,025 | A | | 4/2000 | Tillner | |
| 6,124,019 | A | | 9/2000 | Mense | |
| 6,478,382 | B1 | * | 11/2002 | Schulte | ..................... 297/452.6 |

(Continued)

FOREIGN PATENT DOCUMENTS

DE        298 22 649 U1    4/1999

(Continued)

*Primary Examiner*—Rick K Chang
(74) *Attorney, Agent, or Firm*—Roylance, Abrams, Berdo & Goodman, L.L.P.

(57) ABSTRACT

A method for the production of a fixing piece (12, 36) serves for fixing of covering material to cushion pieces for vehicle seats. A profile body (12) is connected to a separately produced sewn tag (36) which at least partly engages in a housing opening (34) in the profile body (12). The profile body (12) and the sewn tag (36), at least in the common jointing positions thereof, are predominantly made of plastic materials. According to the present invention, the known welding and glued connecting applications can be further improved such that the production method can be rapidly carried out with low production costs and without additional materials. A strong connection can be achieved, conforming to more stringent environmental aspects. Fusion temperatures of the plastic materials employed for the profile body (12) and the sewn tag (36) are selected with a difference such that one plastic material remains essentially stable in form under thermal effect during generation of the joint, and the other plastic material flows into recesses (38) formed in the first plastic material, and is solidified in the recesses (38) on cooling.

6 Claims, 3 Drawing Sheets

U.S. PATENT DOCUMENTS 6,511,562 B1 * 1/2003 Coffield .................. 156/66
2004/0032051 A1 2/2004 Schulte

FOREIGN PATENT DOCUMENTS

| | | |
|---|---|---|
| DE | 199 52 416 C1 | 2/2001 |
| DE | 100 54 073 A1 | 5/2002 |
| EP | 0 403 815 A | 12/1990 |
| EP | 1 060 092 A | 12/2000 |
| EP | 1 243 462 A | 9/2002 |
| FR | 2 750 690 A | 1/1998 |

* cited by examiner

METHOD FOR PRODUCTION OF A FIXING PIECE

FIELD OF THE INVENTION

The method is for production of a fixing piece used in particular for fastening cover material to upholstery components of motor vehicle seats. A profile component is connected to a separately produced sew-on tag introduced at least partly into a mounting opening in the profile component. The profile component and the sew-on tag are predominantly of plastic materials, at least at their bonding point.

BACKGROUND OF THE INVENTION

DE-U-89 07 459 discloses an insertion rod for shaping upholstery materials covered externally in the case of upholstered furniture and similar upholstered seat components. This rod is a one-piece extruded shaping rod made of a plastic to which is rigidly connected a separately produced sew-on tag for its bonding to the cover material. The shaping rod has a two-sided shaping profile. The two sides are joined at their base by a narrow connecting strip, and delimit a mounting slot extending from this strip for the sew-on tag. The tag is rigidly bonded to the adjoining interior surface of the two profile sides.

To apply the disclosed solution, the insertion rod as profile component and the sew-on tag are bonded in a process in which the plastic materials of profile component and sew-on tag are melted and joined together by pressing. In the disclosed bonding processes, melting of the plastic materials results in damage, especially in the transitional area between the bonding seam and the adjoining plastic material of the components to be bonded, reducing the tear resistance. If thermal peaks occur during the bonding process, the danger exists that the bonding seam itself may be directly damaged. In addition, the known bonding processes require application of additional bonding heat to produce the bond, so that machinery and energy expenditures are increased in the disclosed processes, something which correspondingly increases manufacturing costs. The disadvantages could also be encountered if, in addition to the disclosed process specified for the German utility model, the bonding were to be effected by introduction of an additional material. This additional material has not been disclosed directly in connection with this utility model.

EP 1 060 092 B1 discloses another fastening system for a passenger seat having an upholstery element of a foam material enclosed in at least one upholstery cover component connected to a shaping strip serving as interlocking means as profile component and having interlocking elements on the exterior circumference. A longitudinal channel is adapted to the shape of the respective shaping strip in the foam upholstery element. The longitudinal channel in the upholstery element has recesses in the longitudinal direction serving the purpose of engagement of the interlocking elements of the profile component, ending in the longitudinal channel and being in the form of grooves. The disclosed shaping strip is configured as profile component as a semicircular rod, and thus, has a convex contact surface on its side facing the foam. On its opposite side, the shaping strip is configured to be level and is provided in its center with a slot-like seating channel as mounting opening for the sew-on tag to which in turn the upholstery cover component is fastened.

To produce this disclosed means of fastening, the sew-on tag may in turn be bonded to the shaping strip as profile component as described above. The foregoing or the respective bond is effected by adhesive means. A specially adapted plastic adhesive is readily obtainable on the market effecting the strong bond required. Since such adhesives are generally very expensive to produce, they make production of the fastening system more expensive. If the adhesive is configured as a two-component system, it must first be allowed to set properly for production of the strong bond, lengthening the production time required and accordingly increasing the cost. Since a large number of the plastic adhesives currently used contain solvents, evaporation of the solvent results in embrittlement of the areas to which adhesive is applied. Failure of the glued seam, and thus, of the point of bonding of the shaping strip and the sew-on tag may occur during the effective service life, at least in the long term. Adhesives containing solvents are not recommended for reasons of protecting the environment, in that they make subsequent recycling of seats and seat parts more difficult.

SUMMARY OF THE INVENTION

An object of the present invention is to provide and improve production processes for the fastening component including a profile component and sew-on tag which may be effected rapidly and at low cost, while producing a very strong bond and a greater allowance for environmental aspects.

This object is basically attained by a process where the melting point ranges selected for the plastic materials employed for the profile component and sew-on tag may vary in such a way that one plastic material remains more or less stable in shape when subjected to thermal action as the bond is established. The other plastic material extends into recesses of the one plastic material, and hardens during cooling. An intrusion solution is realized, one in which a part of the melted or plasticizable plastic material penetrates cavities (recesses) in the one plastic material and hardens there to produce a positively locked bond. The one plastic material has the recesses remaining unaffected in its structural configuration because of the different range of melting point temperatures. Consequently, the application of the bonding process of the present invention is not sealed or adhesive bonds. The plastic material of a part of the bond is positively locked in the plastic material of the other bonding component, and thus, is kept stable by a form of pour-in or intrusion process.

The plastic materials are neither damaged nor strained thermally in the embedding process. This embedding favors production of a strong bond at the point of bonding of the profile component and sew-on tag. A plurality of options for anchoring the plastic materials to each other are provided by the pour-in or intrusion process, something which results in high holding forces. The average expert in the field of the respective bonding technology is also surprised to learn that, without resorting to a bonding process and without additional materials such as an adhesive, very strong bonds are obtained in this manner. Tensile and tearing tests have shown that it is the initial components such as profile components or sew-on tags which fail rather than the bonding thus established by intrusion. In addition, omission of adhesives containing solvents makes a greater contribution to more stringent environmental aspects. The fastening component may immediately undergo environmentally sound recycling.

In one preferred embodiment of the process of the present invention provision is made such that the profile component is made from an extrudable plastic material and such that the sew-on tag is of a non-woven material, a formed fabric in particular. The plastic material of the profile component is subjected to thermal action and penetrates the interstices (recesses) of the fiber clusters of the formed fabric to establish the intrusion bond. Practical experiments have demonstrated that only a few layers of fiber on the non-woven material side are required to create the depth of penetration for the melted-on plastic material to produce the effective high-strength bond.

It has been found to be especially advantageous to make the profile component itself of a soft polyvinyl chloride (PVC) material or of a polypropylene block copolymer. In addition, the sew-on tag preferably is formed of a polyester non-woven material.

In one especially preferred embodiment of the process of the present invention, the sew-on tag is introduced into the mounting opening in the profile component immediately after the tag has undergone extrusion. The penetration process is initiated by pressing together the wall components adjacent to the insertion opening with the accommodated components of the sew-on tag. The possibility also exists, however, of introducing and applying the sew-on tag simultaneously with extrusion of the profile component.

The term "sew-on tag", as used in this application, describes the connecting component between upholstery cover and upholstery component, especially in the form of elastic foam components. The upholstery cover need not be, for example, in the form of an upholstery cover material of a motor vehicle seat, to be secured by the sew-on tag. The bond may also be produced by adhesives, thermal bonding, or the like. In addition, the profile component need not be anchored directly in the foam of the individual upholstery components. The possibility also exists, as has been demonstrated in the prior art, of introducing into the foam shaped interlocking elements to which the strip-like profile components may be clip-connected for fastening the upholstery cover to the upholstery points.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
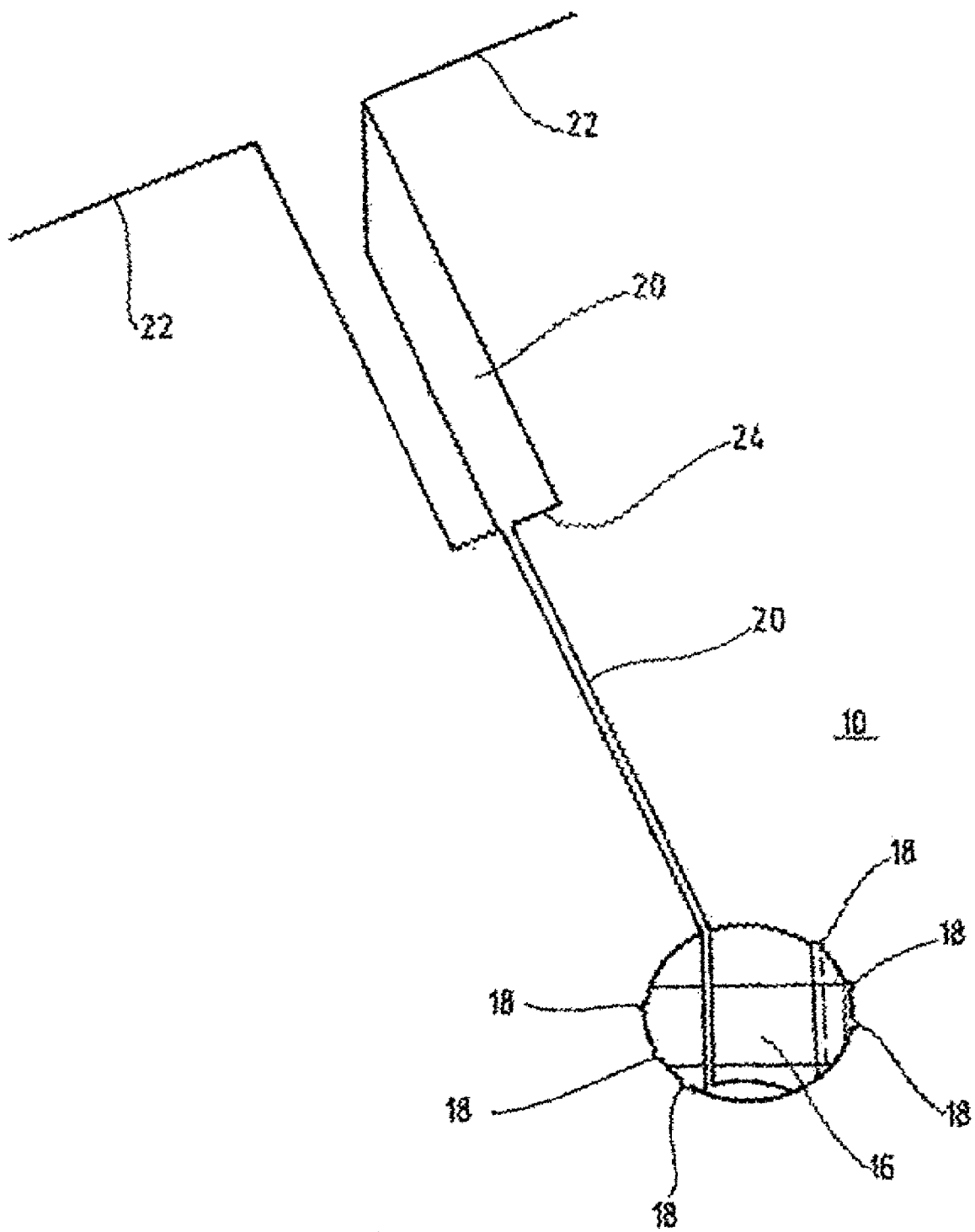
FIG. 1 is a perspective view of a partial section of a foamed upholstery element with slotted opening and longitudinal channel according to an embodiment of the present invention.
Figure 2:
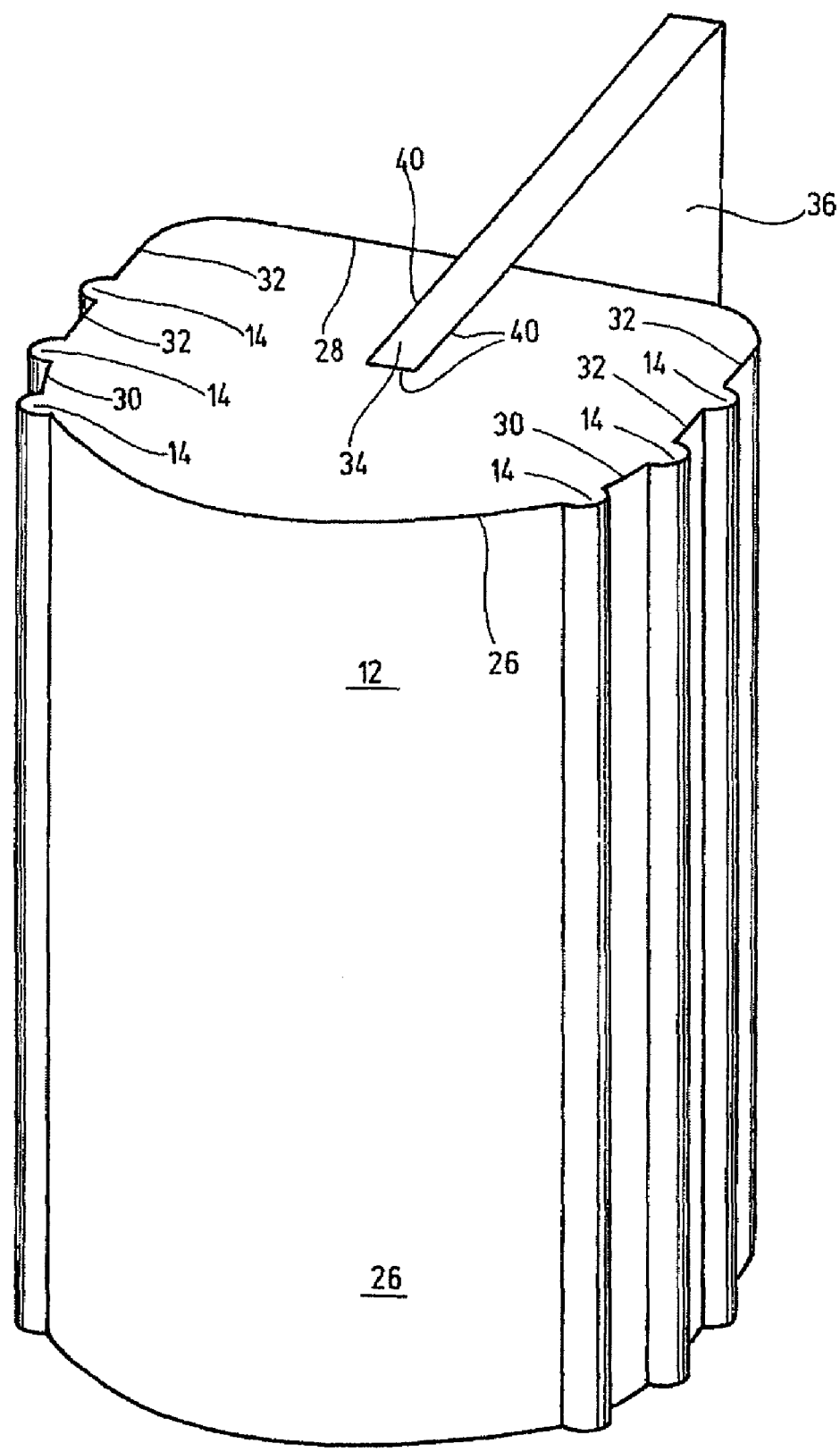
FIG. 2 is a perspective view of a partial section of a shaping strip with sew-on tag such as may be introduced into the longitudinal channel of the upholstery element shown in FIG. 1.

The fastening system shown in FIGS. 1 and 2 may be used for a vehicle seat (not shown), such as a motor vehicle or aircraft passenger seat. However, applications in the area of medical technology for treatment chairs or for utilitarian furniture for residential living are also conceivable and possible. Such seats essentially include a seat component and a backrest component provided with upholstery, in particular in the form of individual upholstery components 10 (see FIG. 1).

Upholstery components 10 such as this are of plastic material foam molded in situ, and are enclosed on the exterior in at least one upholstery cover component (not shown), such as in the form of upholstery cover materials or the like. A fastening component fastens the upholstery cover component to the upholstery component 10 in seam patterns, and serves to bond the upholstery cover to the upholstery component 10.

The fastening component has at least one strip-shaped or rod-shaped profile component 12 serving as interlocking means which is flexible and is connected to separating seams on the upholstery cover component. As is shown by FIG. 2 in particular, the profile component 12 has interlocking elements 14 on the external circumference side. As is shown in FIG. 1, the upholstery component 10 a longitudinal channel 16 therein adapted to the shape of the profile component 12. The longitudinal channel has in its longitudinal direction additional longitudinal channels 18 for engagement with the interlocking elements 14. The longitudinal channel 16 is configured to be more or less round in cross-section. A slotted opening 20 communicates with the longitudinal channel 16, and emerges to the exterior on the outside of the foam upholstery element 10. As FIG. 1 shows, the slotted opening 20 widens from the longitudinal channel 16 to the outside 22 with a ledged step 24 in cross-section. The recesses 18 of the longitudinal channel 16 lie diametrically opposite each other in the longitudinal direction and communicate in the form of grooves with the longitudinal channel 16. The other longitudinal channels 18 are configured as groove-like hollow profile ridge sections.

The interlocking elements 14 form an integral part of the profile component 12 and engage the groove-like additional longitudinal channels 18 over their entire longitudinal orientation. The profile component 12 to be introduced into the associated longitudinal channel 16 is provided on its side facing away from the slotted opening 20 with a contact surface 26. Contact surface 26 is convex in configuration. The profile component 12 is configured to be level or flat on its opposite, rear side 28. The contact surface 26 is bounded on the edge in the longitudinal orientation of the profile component 12 by the immediately following interlocking elements 14. The respective sectional portion 30 between two interlocking elements 14 which follow in sequence on the side of the contact surface 26 is also configured to be convex and accordingly provided with a rounding. The next following sections 32 of each side wall of the profile component 12 are designed to be level or flat.

The level rear side 28 of the profile component 12 is provided in the center with a slot-like seating channel 34 forming a mounting opening which extends to communicate with the slotted opening 20 when the profile component 12 has been introduced into the longitudinal channel 16. This slot-like mounting opening 34 of profile component 12 receives a sew-on tag 36 configured as a connecting strip extending between the profile component 12 and the upholstery cover component (not shown) stretched along a seam boundary. The rear free end of the sew-on tag 36, as viewed in FIG. 2, is rigidly connected to the respective upholstery cover component, either by sewing, stitching, bonding, adhesion, or the like. Consequently, the term "sew-on tag" is not restricted exclusively to bonds in which the upholstery cover is sewn onto the connecting strip 36. Hence, the profile component 12 may be connected to the upholstery cover by the sew-on tag 36. The sew-on tag 36 then extends under tension through the slotted opening 20 in the upholstery component 10. The upholstery cover material tends to be pulled in the direction of the longitudinal channel 16.

The profile component 12, configured to be more or less solid and customarily referred to in technical language also as a "piping profile", preferably is a monoextrudate and is formed of a soft plastic material. Preferably, the profile material is a soft polyvinyl chloride (PVC) material, the melting range of which preferably is >75° C. The temperature at which the material is to be processed preferably falls within the range of 140° C. to 160° C. The soft PVC material as shaped material may also be replaced by a polypropylene block copolymer with a softening point of around 125° C., a melting point of around 163° C., and a processing temperature of around 200° C. In addition, the profile may also be of a polyethylene material the softening point of which is around 90° C. and whose melting point is around 115° C. Preferably, the sew-on tag 36 is of a polyester non-woven material with a melting point of 256° C. and a softening point above 220° C.

Reference will now be made to the process of the present invention for producing a fastening component of the profile component 12 and of the sew-on tag 36, as used in particular for fastening upholstery cover materials to upholstery components of motor vehicle seats. The profile component 12 is connected to the separately produced sew-on tag 36, which is engaged along its one free end in the mounting opening 34 of the profile component 12. The profile component 12 and the sew-on tag 36, as has already been pointed out, at their common bonding point are predominantly of plastic materials of the type described in the foregoing.

Figure 3:
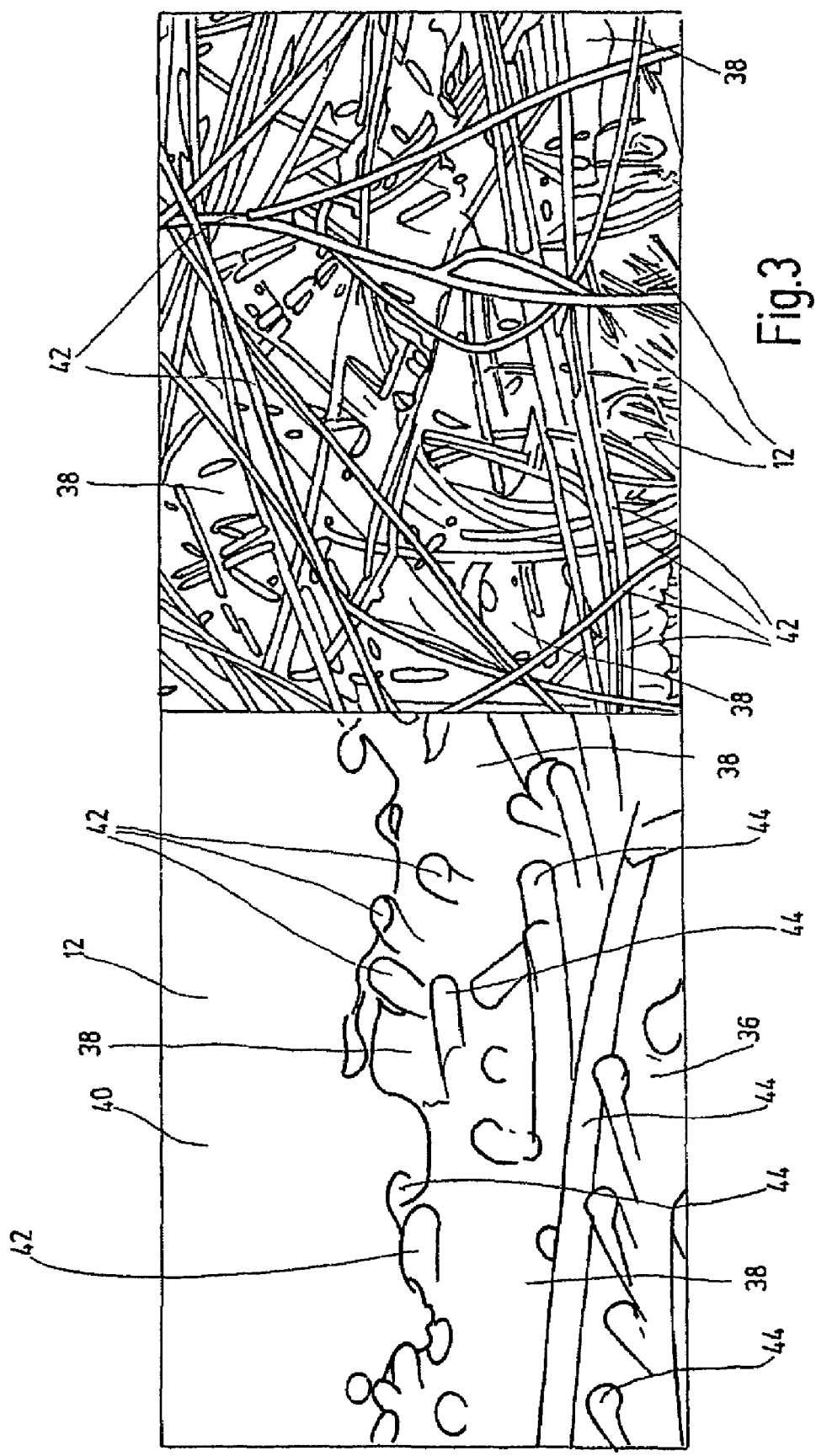
FIG. 3 is an illustration of two different scanning electron microscope photographs of gold-sputtered parts relating to the bonding point of profile component and sew-on tag as shown in FIG. 2, showing a part of the bonding wall sections involved.

Since different melting temperature ranges, as indicated above, are selected for the plastic materials employed for the profile component 12 and sew-on tag 36, the shape of one of the plastic materials remains more or less stable when subjected to thermal action in production of the bond. The other plastic material is introduced into recesses 38 (see FIG. 3) made up of a plastic material and solidifies during cooling in the recesses 38. To produce the bond itself, the sew-on tag 36 is introduced into the mounting opening 34 of the profile component 12 either immediately after its extrusion process or simultaneously with this process. The penetration process (intrusion) is initiated by subsequent pressing together of the wall components 40 of the profile component 12 adjoining the mounting opening 34 and the parts of the sew-on tag 36 which have been introduced.

The sew-on tag 36, configured to be flexible, is essentially of a plastic non-woven material or of another non-woven material that is not of woven or knitted surface formations of different fiber materials. The fibers of such material may also be in the form of continuous fibers or staple fibers. The fiber layers of the non-woven sew-on tag 36 made of individual fibers are shown on the left as viewed in FIG. 3. As FIG. 3, relating to bonding of profile component 12 to sew-on tag 36 also shows, the plastic material of the profile component 12, as a result of intrusion, penetrates the interstices between the individual fibers 42 of the fiber layers 44 of the sew-on tag 36 and encloses the respective fibers 42, without bonding of the plastic materials of sew-on tag 36 and profile component 12 to each other. The fibers 42 rather are enclosed by positively locking by the plastic material of the profile component 12 by pouring in or embedding. Experiments have shown that to produce high-strength bonding, it suffices for the first adjacent fiber layers 40 of the sew-on tag 36 to be enclosed along the wall components 40 and that complete intrusion of the entire non-woven cross-section of the sew-on tag 36 by the fiber layers is not required for high-strength bonding.

Since integral casting of one plastic material with the other plastic material does not result in bonding of the plastic materials to each other, the possibly damaging introduction of heat otherwise customary in sealing is avoided. Since at least the plastic material of one bonding component remains undamaged, a plurality of anchor points are obtained which make it possible to obtain a high-strength bond. It has been found that it is the non-woven material which fails in tensile or adhesion tests rather than the bond of profile component 12 with sew-on tag 36 obtained by an intrusion process.

In other exemplary embodiments (not shown), plastic materials can be selected with their different melting point ranges so that the material of the sew-on tag 36 intrudes into the interstices of the plastic material of the profile component 12, or that materials are selected so that alternate intrusion or blending is possible. The non-woven materials referred to could also be replaced by woven or interlaced fiber clusters In that possibly, fewer interlocking and tying points might remain for the plastic material to be poured in, with a loss of strength at the bonding point being expected.

While one embodiment has been chosen to illustrate the invention, it will be understood by those skilled in the art that various changes and modifications can be made therein without departing from the scope of the invention as defined in the appended claims.

What is claimed is:

1. A method of producing a fixing piece to fasten cover materials on upholstery components in seats, comprising the steps of:
   producing a profile component with a mounting opening therein predominantly from a first plastic material with a first melting point range;
   producing a sew-on tag separately from the profile component and predominantly of a second plastic material with a second melting point range, said first and second melting point ranges being different;
   locating a portion of the sew-on tag in the mounting opening of the profile component;
   subjecting the profile component and the sew-on tag to thermal action so that one of the first and second plastic materials remains substantially stable while the other of the first and second plastic materials penetrates recesses in the one of the first and second plastic material; and
   cooling the plastic materials of the profile component and the sew-on tag such that the other of the first and second plastic materials solidifies in the recesses to bond the profile component and the sew-on tag.

2. A method according to claim 1 wherein
   the first plastic material is extrudable; and
   the sew-on tag comprises one of a non-woven material, a formed fabric and an open-pore woven material.

3. A method according to claim 2 wherein
   the first plastic material is at least one of soft polyvinyl chloride material and a polypropylene block material; and
   the second plastic material comprises a polyester non-woven material.

4. A method according to claim 1 wherein
   the profile component is extruded;
   the sew-on tag is bonded to the profile component by being mounted in the mounting opening at one of immediately after extrusion of the profile component and simultaneously with extrusion of the profile component; and
   wall components of the profile component adjoining the mounting opening and the portion of the sew-on tag in the mounting opening are pressed together to initiate penetration of the other of the first and second plastic materials into the recesses.

5. A method according to claim 4 wherein
   said second melting point range is greater than said first melting point range.

6. A method according to claim 1 wherein
   said second melting point range is greater than said first melting point range.

* * * * *